United States Patent [19]

Jaisinghani

[11] 4,374,029
[45] Feb. 15, 1983

[54] REGENERATIVE FILTER

[75] Inventor: Rajan A. Jaisinghani, Stoughton, Wis.

[73] Assignee: Nelson Industries, Inc., Stoughton, Wis.

[21] Appl. No.: 260,422

[22] Filed: May 4, 1981

[51] Int. Cl.³ .................. B01D 15/00; B01D 23/16
[52] U.S. Cl. .................... 210/671; 210/794; 210/799; 210/275; 210/290
[58] Field of Search ............... 210/792–794, 210/274, 275, 277–279, 290, 799, 671

[56] References Cited

U.S. PATENT DOCUMENTS

| | | | |
|---|---|---|---|
| 3,557,961 | 1/1971 | Stuart | 210/290 |
| 3,876,546 | 4/1975 | Hsiung et al. | 210/290 |
| 4,197,205 | 4/1980 | Hirs | 210/290 |
| 4,315,822 | 2/1982 | Jasinghani | 210/794 |

FOREIGN PATENT DOCUMENTS 55-18219  2/1980  Japan .................. 210/290
2000042  1/1979  United Kingdom ....... 210/290

Primary Examiner—Benoît Castel
Attorney, Agent, or Firm—Andrus, Sceales, Starke & Sawall

[57] ABSTRACT

A regenerative filter having particular application for removal of oil from water. The filter includes a bed of finely divided particles or media separated in three horizontal layers. The top layer is comprised of anthracite particles, the middle layer of silica sand particles, and the bottom layer of garnet sand particles. The filter bed is supported within the filter vessel by a strata of relatively coarse support particles located beneath the bottom layer of filter media. The oil-contaminated water is fed into the top of the vessel and flows through the filter bed and supporting strata to a manifold at the bottom of the tower where it is discharged. By proper selection of the type and size of the media, effective removal of oil from the water is achieved during filtering and loss of media and intermixing of the layers is prevented during the back washing cycle.

2 Claims, 1 Drawing Figure

4,374,029

REGENERATIVE FILTER

BACKGROUND OF THE INVENTION

In the past, oil-water separators have usually incorporated replaceable coalescer cartridges. While the coalescer cartridges are effective in removing the oil from the water, they have a relatively short service life particularly when dealing with large volumes of liquids.

Sand bed filters have been used in the past in municipal and industrial applications, primarily for the removal of suspended solids from water or other liquids. More recently, sand bed filters have been used in large industrial applications for the separation of oil from water. While sand bed filters are not as effective in removing the oil from water as a coalescer, they do have the advantage that they can be regenerated by backwashing.

The typical sand bed filter, as used in the past, is composed of a number of different layers or strata of particulate material. Materials such as anthracite, silica sand, and garnet sand, have been used in the past as the filtering media. The use of multimedia filters creates a need for extreme care in media selection and backwash design to prevent loss of media and intermixing of the layers during backwashing. This is particularly true when the filter is designed to separate oil from water, because the oil adsorbed on the particles adds buoyancy to the bed and the increased buoyancy during backwashing can cause loss of media and intermixing of the strata.

SUMMARY OF THE INVENTION

The present invention is directed to a regenerative bed filter having particular application for separating oil from water, as for example, separating oil from bilge water aboard a ship. The apparatus of the invention includes a vertical tower or vessel which contains a filter bed for removing the oil and suspended solids from the water or other liquid to be filtered.

The filter bed is composed of particulate material and is separated into at least three horizontal layers or strata. The top layer is composed of anthracite coal particles, the middle layer of silica sand particles, and the bottom layer of garnet sand. The contaminated water is fed to the top of the column and flows downwardly through the filter bed which removes the oil and other solid contaminants. The filtered water is collected at the bottom of the vessel and is discharged through an outlet.

The filter bed is supported within the vessel by means of a strata of relatively coarse support particles located in the bottom portion of the vessel beneath the bottom layer of garnet sand. The supporting media prevents loss of the filtering media during the filtering operation and has a size such that it will not be disrupted during the backwashing cycle.

The media used in the filter bed has a composition and size selected to provide effective removal of oil from the water during the filtering cycle and to prevent loss of the media and intermixing of the layers during the backwashing cycle. More particularly, the top layer is made up of anthracite coal particles which have an effective size of 0.75 to 0.85 mm and a maximum uniformity coefficient less than 2.0, the particles of silica sand have an effective size of 0.4 to 0.55 mm and a maximum uniformity coefficient less than 1.5, while the garnet sand particles of the bottom layer have an effective size of 0.25 to 0.35 mm and a maximum uniformity coefficient less than 1.8. The ratio of the depth of the anthracite layer to that of the silica sand layer is about 3:2 and the ratio of the depth of the silica sand layer to that of the garnet layer is about 1:5.

In another aspect of the invention the vessel includes a dome-shaped head and there is an inlet pipe located in the upper portion of the vessel that opens vertically upwardly above the top layer of anthracite particles. The inlet pipe is positioned so that the contaminated liquid under pressure to be filtered gushes from the pipe opening in the form of a geyser across the top layer of filter particles. This provides an effective means for uniformly distributing the contaminated water across the filter bed.

The apparatus of the present invention may be utilized with gravity feed as well as pressurized feed and thus is readily adaptable with existing water separating systems.

Other objects and advantages will appear in the course of the following description.

DESCRIPTION OF THE DRAWINGS

The drawings illustrate the best mode presently contemplated of carrying out the invention.

In the drawing.

DESCRIPTION OF THE PREFERRED EMBODIMENT

Figure 1:
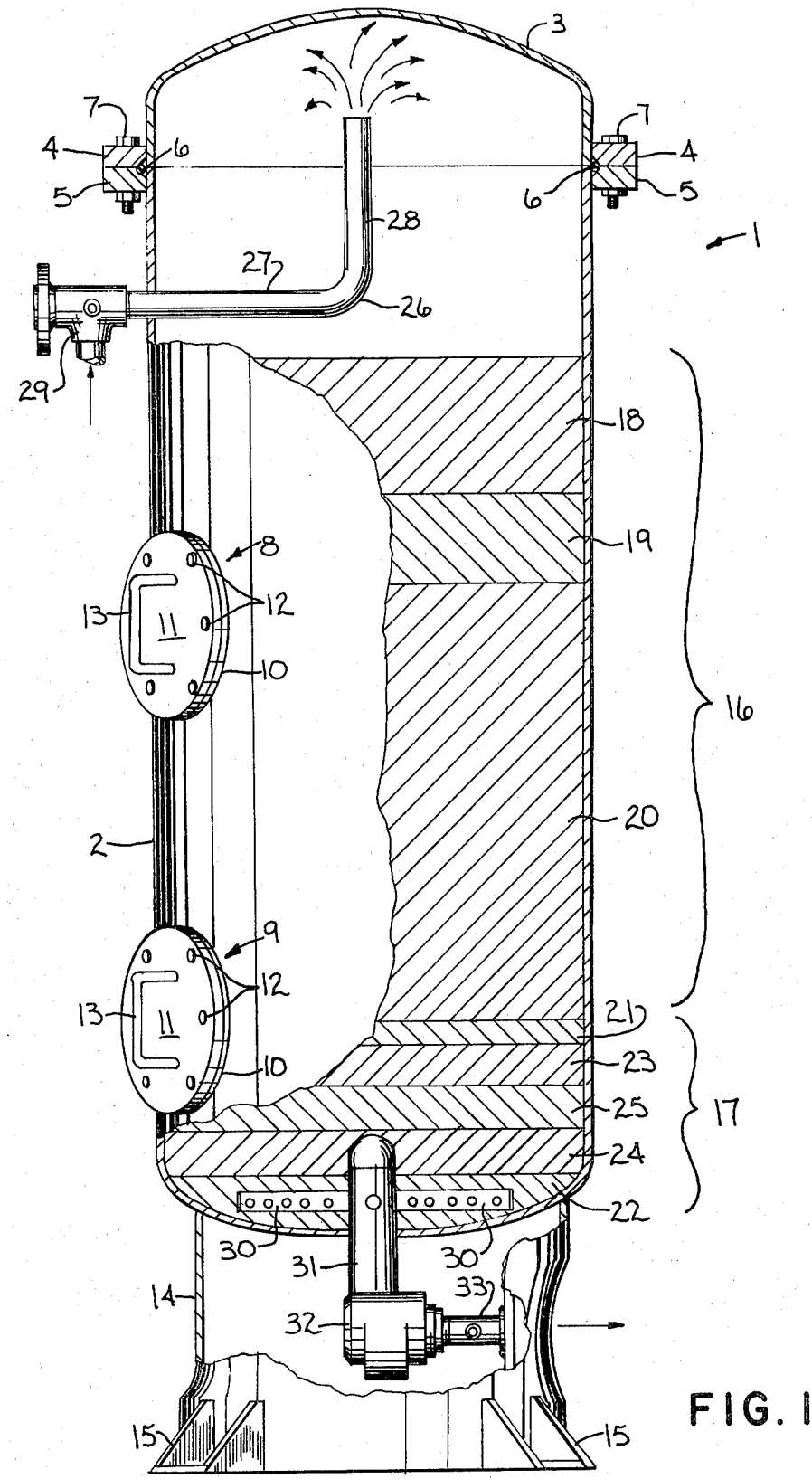
FIG. 1 is a side view in elevation with parts broken away showing an oil separating system incorporating the regenerative filter bed of the present invention.

Referring now to the drawing, FIG. 1 illustrates an apparatus generally designated by the numeral 1 for filtering oil and other impurities from contaminated water. The apparatus of the invention is particularly adapted for removing oil from bilge water.

The apparatus includes a vertically disposed cylindrical tower filter tank or shell 2 having an enclosed bottom and an open top. The open top of tank 2 is enclosed or covered by a removable head assembly which includes a dome-shaped head 3. The head 3 includes a circular flange 4 extending from its lower edge for mating engagement with a circular flange 5 extending around the top edge of tank 2. An O-ring 6 is disposed between the flanges 4 and 5 to provide a fluid tight seal. The head assembly also includes a plurality of bolts 7 which extend through the mating flanges 4 and 5. The bolts 7 are disposed circumferentially around the tank 2 and are equispaced from one another so that when tightened the head 3 is securely attached to the top of tank 2. To remove head 3 and open the top of tank 2, the bolts 7 are loosened and head 3 is swung to one side of tank 2.

Tank 2 includes an upper access port 8 and lower access port 9 each including a cover plate assembly having a gasket 10 and coverplate 11. Each coverplate 11 is removably secured to tank 2 by means of a plurality of bolts 12 circumferentially disposed about its outer edge margin and equispaced from one another. Each coverplate assembly also includes a handle 13 to aid in removing and replacing its coverplate 11. Tank 2 is supported on a floor or deck by means of a hollow skirt 14 attached to its bottom. The skirt 14 includes four wedge-shaped brackets 15 attached to its lower edge margin and equispaced from one another to aid in stabilizing tank 2.

Contained within tank 2 is a stratified filter bed 16 for removing oil from the contaminated water to be filtered, and a supporting strata 17 disposed beneath filter bed 16 for supporting filter bed 16 within tank 2. Filter bed 16 comprises a column of filter particles or media separated into three horizontal layers or sections. The first and top layer of the filter media is comprises of anthracite coal particles 18 having a range of effective size of 0.75 to 0.85 mm and a maximum uniformity coefficient of less than 2.0. The range of effective size is commonly defined as that size wherein 10% of the media particles by weight are smaller than the stated size. In other words, an effective size of about 0.8 mm means that 10% of the anthracite particles have a size less than 0.8 mm.

The maximum uniformity coefficient is defined as the ratio of a diameter (1), wherein 60% of the particles by weight are smaller than the stated diameter (1), divided by the diameter (2) wherein 10% of the particles by weight are smaller than the stated diameter (2).

The second and middle layer or section of filter media is comprised of silica sand particles or grains 19 having an effective size in the range of from 0.40 to 0.55 mm, and preferably about 0.48 mm, and a maximum uniformity coefficient less than 1.5. The depth of this media layer is preferably about 4 inches.

The third and bottom layer or section of filter media is comprised of garnet sand particles or grains 20 having an effective size in the range of from 0.25 to 0.35 mm and preferably about 0.28 mm, and a maximum uniformity coefficient of less than 1.8. The depth of the garnet sand layer is preferably about 20 inches.

It can be seen from the above description that that ratio of the depth of the first or anthracite layer (6 inches) to that of the second or silica sand layer (4 inches) is 3:2, and the ratio of the depth of the second or silica sand layer (4 inches) to that of the third or garnet layer (20 inches) is 1:5.

The supporting strata 17 is located within tank 2 beneath the bottom or garnet layer 20 of filter paricles and includes a column of support particles or sections. The supporting particles prevent loss of the filter particles or media from the tower, and include granite, silica sand and rock with a horizontal layer of coarse rock 21 disposed adjacent to and directly beneath the bottom layer of garnet particles 20. A second layer of coarse rock 22 is disposed at the bottom of tower tank 2. Rock layer 21 is preferably about one inch in depth, and rock layer 22 is preferably about 3.5 inches in depth. These rock layers 21 and 22 are the most coarse support media and are therefore positioned as the uppermost layer and lowermost layer in the supporting strata 17 so that they prevent the support media from being disturbed during backwashing or cleaning of filter bed 16.

Supporting strata 17 also includes two horizontal layers of smaller granite particles 23 and 24 disposed between rock layers 21 and 22, respectively, and a horizontal layer of silica sand particles 25 disposed between granite layers 23 and 24. The supporting strata is designed to prevent loss of the filtering media during the filtering operation and has a size such that it will not be disrupted during backwashing.

An inlet pipe 26 is provided in the upper portion of tank 2 for directing the contaminated water to be filtered to the top of the filter media column. Inlet pipe 26 includes a horizontal portion 27 and a vertical portion 28 with the vertical portion 28 extending vertically upwardly along the longitudinal axis of tank 2. The vertical portion 26 opens upwardly above the top layer of anthracite particles 18 and is positioned so that the contaminated water under pressure to be filtered gushes from the pipe opening in the form of a geyser to be uniformly distributed across the top layer of anthracite particles 19. Some of the water is also sprayed against the inside of head 3 which aids in distributing the water across the filter media. A valve 29 is connected to the horizontal portion 27 of inlet pipe 26 and is located outside of tank 2. Valve 29 is manually actuatable to control the flow rate of the contaminated water entering filter 1.

A collecting manifold 30 is located in the bottom of tank 2 and extends radially into the bottom rock layer 22. Manifold 30 includes a plurality of holes formed therein which collect and receive the vertically flowing filtered water. Manifold 30 also includes a central portion 31 which leads to the inlet of a pump 32 disposed within hollow skirt 14. Pump 32 discharges the filtered water from the filter apparatus 1 through an outlet pipe 33. Outlet pipe 33 may be connected to the inlet of other onboard systems or the filtered water may be pumped directly overboard.

The filter bed is regenerated by backwashing. The oil which is adsorbed on the particles of the filter bed adds buoyancy to the bed which can increase the turbulence within the bed during backwashing and lead to a loss of media. The composition, particle size and depth of the layers of the filter bed are designed to provide effective removal of oil from the bed during backwashing and yet prevent the loss of media and intermixing of the layers.

The backwashing is accomplished by successively and separately passing water, air and water upwardly through the filter bed. To backwash the bed, a water line is connected to pipe 33 and water is introduced into the lower end of the tank 2 and passes upwardly through the bed 16. The water velocity during backwashing is in the range of 1.8 to 2.25 times the velocity of the water in the filtering operation. The first backwashing cycle is continued for a period of about 3 to 5 minutes.

Following the water backwash cycle, air is introduced into the lower end of the tank through pipe 33 and the air preferably is used with a volume of 2 to 4 cfm/sq.ft. of bed area, and the air backwashing cycle is continued for a period of about 3 to 5 minutes.

After the air backwash, the bed is again backwashed with water at the same rate and for the same time period as the first water backwash.

By use of the specified composition, particle size and depth of the bed, along with the separate water and air backwash cycles, the oil is effectively removed from the particles of the bed without undue fluidization of the bed which could cause loss of media and intermixing of the media layers.

Various modes of carrying out the invention are contemplated as being within the scope of the following claims particularly pointing out and distinctly claiming the subject matter which is regarded as the invention.

I claim:

1. An apparatus for separating oil from water, comprising a vessel, a filter bed contained within the vessel for removing the impurities in the liquid to be filtered, said filter bed comprising a column of finely divided particles separated into at least three horizontal layers including a top layer, an intermediate layer and a bottom layer, said top layer being comprised of anthracite particles having an effective size of 0.75 to 0.85 mm and a maximum uniformity coefficient less than 2.0, said intermediate layer being composed of silica sand particles having an effective size of 0.4 to 0.55 mm and a maximum uniformity coefficient less than 1.5, said bottom layer being composed of garnet sand particles having an effective size of 0.25 to 0.35 mm., a maximum uniformity coefficient less than 1.8, and a depth of about 20 inches, the ratio of the depth of the top layer to that of the intermediate layer is about 2:3 and the ratio of the depth of the intermediate layer to said bottom layer is about 1:5, coarse particulate support means located beneath said bottom layer for supporting said filter bed within the vessel, inlet means in the upper end of the vessel for introducing oil-contaminated water to be filtered to the top of said filter bed, said water passing downwardly through the bed with said oil being adsorbed on the particles of said filtering layers, and outlet means in the lower end portion of the vessel for discharging filtered water.

2. The method of separating oil from water comprising the steps of forming a multi-layer filter bed, said filter bed comprising a column of finely divided particles separated into at least three horizontal layers including a top layer, an intermediate layer and a bottom layer, said top layer being coprised of anthracite particles having an effective size of 0.75 to 0.85 mm and a maximum uniformity coefficient less than 2.0, said intermediate layer being composed of silica sand particles having an effective size of 0.4 to 0.55 mm and a maximum uniformity coefficient less than 1.5, said bottom layer being composed of garnet sand particles having an effective size of 0.25 to 0.35 mm, a maximum uniformity coefficient less than 1.8, and a depth of about 20 inches, the ratio of the depth of the top layer to that of the intermediate layer is about 2:3, the ratio of the depth of the intermediate layer to said bottom layer is about 1:5, said filter bed being supported within the column by a strata of relatively coarse support particles located beneath the bottom layer, flowing oil-contaminated water downwardly through the bed wherein the oil is adsorbed on the particles of the bed, regenerating the filter bed after a period of use by backwashing, said backwashing comprising the steps of introducing water under pressure into the lower end of the bed and flowing the water upwardly through said bed, and thereafter separately introducing air substantially free of water at a volume of 2 to 4 cfm/sq.ft. of filter bed into the lower end of the bed and flowing the air upwardly through said bed, and finally passing a second volume of water upwardly through said bed.

* * * * *